United States Patent Office 3,635,970
Patented Jan. 18, 1972

3,635,970
CRYSTALLINE MELAMINE PYROPHOSPHATE
Robert Glenn Fessler, Martinsville, and Bruce Charles Tredinnick, Bound Brook, N.J., assignors to American Cyanamid Company, Stamford, Conn.
No Drawing. Filed Apr. 17, 1969, Ser. No. 817,168
Int. Cl. C07d 55/24
U.S. Cl. 260—249.6                7 Claims

ABSTRACT OF THE DISCLOSURE

A new crystalline form of melamine pyrophosphate having its maximum intensity at a peak in its X-ray diffraction pattern of 3.25 A. and a process for making it wherein a pyrophosphate salt is added to an aqueous system of melamine and a mineral acid present in at least twice the stoichiometric amount of melamine are provided.

---

This invention relates generally to melamine pyrophosphate and, more particularly, to a novel crystalline form thereof, a process for making the novel crystalline form and intumescent fire retardant compositions containing it.

It has been proposed heretofore to prepare melamine pyrophosphate by reacting melamine in an aqueous slurry with a mineral acid such as, for example, hydrochloric acid, nitric acid or sulfuric acid to form a melamine acid salt, reacting the salt with sodium pyrophosphate and then adding more acid to pricipitate the melamine pyrophosphate. In processes of this type, it has been the practice to use less than the amount of acid required for completion of the reaction until after the addition of the sodium pyrophosphate. In one convenient form of this method, melamine and sodium pyrophosphate are first dispersed in water. Sufficient mineral acid is added to provide a melamine to acid molar ratio of 1:1. The slurry is heated and then more acid is added to effect the precipitation of the melamine pyrophosphate. Many of the various known processes for preparing melamine pyrophosphate are disclosed by Vol'frovich et al., Izv. Akad, Nauk SSSR, Otd. Khim. Nauk, No. 6 (1946) pp. 571–579.

One important utility of melamine pyrophosphate is in intumescent fire and heat retardant paints such as, for example, those disclosed in U.S. Pats. 2,984,640 and 3,284,216. Although melamine pyrophosphate is particularly advantageous for this purpose because it not only acts as the spumific agent but also releases large amounts of a gas containing nitrogen, the heretofore available crystalline form of melamine pyrophosphate has had the disadvantage of thickening an aqueous slurry thereof excessively thereby limiting the quantity of spumific agent permissible in the paint formulation. As a consequence, the aqueous intumescent paints sometimes have not provided sufficient protection for a substrate coated therewith.

It is an object of this invention to provide a novel crystalline form of melamine pyrophosphate. Another object of the invention is to provide a process for making the novel crystalline form of melamine pyrophosphate. A further object of the invention is to provide intumescent coating compositions containing the novel crystalline form of melamine pyrophosphate. A still further object of the invention is to provide melamine pyrophosphate adapted to be suspended in aqueous compositions in greater quantities than heretofore possible without excessive thickening of the slurry.

The foregoing objects and others are accomplished in accordance with this invention, generally speaking, by providing a new crystalline form of melamine pyrophosphate and a process for preparing it wherein a pyrophosphate salt is mixed with an aqueous system containing melamine and a mineral acid, the mineral acid present being at least sufficient to liberate substantially all of the pyrophosphoric acid from the pyrophosphate salt. In a preferred embodiment of the invention, sufficient mineral acid is present in the aqueous medium at the time of the addition of the pyrophosphate salt to provide a total of at least four hydrogen ion equivalents per two moles melamine and one mole pyrophosphate salt. For example, when sulfuric acid is used with tetrasodium pyrophosphate, at least two moles sulfuric acid per mole tetrasodium pyrophosphate are required in the aqueous medium before reaction of the melamine with the tetrasodium pyrophosphate. In another embodiment of the invention, the mineral acid may be added sequentially but the amount of acid present in the aqueous medium must be at all times in excess of that required to liberate all of the pyrophosphoric acid from the pyrophosphate salt present at any time in the aqueous medium containing melamine. When using a pyrophosphate salt containing available hydrogen in the various embodiments of the invention, the mineral acid requirements may be reduced accordingly. In still another embodiment of the invention, melamine is suspended in water, about two moles of a mono-basic mineral acid per mole of melamine are added and the suspension is stirred until solution of melamine as an acid salt and then about one-half mole tetrasodium pyrophosphate is added per mole of melamine used to prepare the suspension.

In order to obtain the best results, the temperature of the slurry and of the solution at the time the pyrophosphate salt is added is from about 50° C. to about 100° C. with the optimum temperature being within the range of from about 75° C. to about 85° C., so this latter range is preferred.

Any suitable pyrophosphate salt may be used in the process of the invention. Most advantageous are the ammonium and alkali metal pyrophosphates including the sodium and potassium salts of pyrophosphoric acid or the hydrates thereof such as ammonium pyrophosphate, tetrasodium pyrophosphate, disodium dihydrogen pyrophosphate, tetrapotassium pyrophosphate and dipotassium dihydrogen pyrophosphate. Although a water soluble pyrophosphate such as a sodium or potassium pyrophosphate is more convenient and is preferred, any suitable alkaline earth metal pyrophosphate such as, for example, calcium or magnesium pyrophosphate may also be used. Although water insoluble, these latter salts are suitable since they dissolve in mineral acid solution generating pyrophosphoric acid required for the reaction.

Any suitable mineral acid may be used in practicing the invention such as, for example, hydrochloric, nitric and sulfuric acids but best results are obtained with hydrochloric acid so it is preferred.

The amount of water used in preparing the melamine pyrophosphate can vary widely it only being necessary to use a volume sufficient to provide a workable slurry. It is not necessary that all of the melamine and salt be in solution when the sodium pyrophosphate or other salt is added because it has been found that the new crystalline form of melamine pyrophosphate is formed even when the melamine acid salt is suspended in water.

It has been found that a novel crystalline form of melamine pyrophosphate is provided by such a process and that the novel crystalline form is advantageous over prior art crystals of melamine pyrophosphate for making aqueous suspensions such as intumescent coatings because a thinner slurry is obtained per unit weight of crystals in the slurry.

This novel crystalline form of melamine pyrophosphate can be distinguished from the prior art melamine pyrophosphate by X-ray analysis. The X-ray diffraction pattern of the novel form of melamine pyrophosphate obtained by the process of the invention has a line or diffraction peak at an interplanar spacing of 10.64 A. which is not found in the X-ray diffraction patterns of the melamine pyrophosphate crystals prepared by previously known methods. Furthermore, there are other peaks at lower relative intensities in the X-ray diffraction pattern of the product of this invention which are different from peaks in the X-ray diffraction patterns of products obtained with other processes. The relative intensities of the other absorption peaks in the X-ray diffraction pattern of the crystalline form provided by this invention differ greatly from the relative intensities at similar absorption peaks in the pattern of the prior art forms. The maximum intensity is at a peak of 3.25 A. in the X-ray diffraction pattern of the crystalline form provided by this invention.

The crystalline form of melamine pyrophosphate provided by this invention also behaves differently upon thermogravimetric analysis. Thus, when the known form is heated, a weight loss occurs from a temperature of about 285° C. up to about 315° C. Upon further heating to higher temperatures, weight loss again begins to take place at a temperature of about 350° C. The new crystalline form of melamine pyrophosphate provided by this invention, on the other hand, loses weight substantially continuously with no interruption as the temperature is increased from about 300° C. up to 350° C. and higher.

The new crystalline form of melamine pyrophosphate can also be distinguished by infrared analysis from one prepared as described in the prior art process. The infrared patterns of the two show several distinguishing differences in the region of 910–475 cm.$^{-1}$. The most important difference is in the region of 750–700 cm.$^{-1}$ where the heretofore available form has two distinct narrow absorption peaks at 740±3 cm.$^{-1}$ and 708±3 cm.$^{-1}$ while the form provided by this invention has a broad absorption band in the range of 710–740 cm.$^{-1}$. In addition, there is a distinctive difference in the ratio of the relative intensities of the peaks at 505 cm.$^{-1}$ and 475 cm.$^{-1}$.

As pointed out hereinbefore, the crystalline form of melamine pyrophosphate provided by this invention provides a thinner slurry per unit weight thereof than that prepared by known processes. The viscosity of aqueous systems expressed in Krebs Units (KU) determined with a Stormer Viscosimeter by the method described at pages 743 and 744 of "Organic Coating Technology," by H. F. Payne, published by John Wiley and Sons, New York, N.Y. (1961) were as follows:

TABLE I

| Grams MPP [1] per 100 grams water | Viscosity (KU), prior art form | Viscosity (KU), form provided by invention |
| --- | --- | --- |
| 80 | 97 | 60 |
| 90 | 118 | 66 |
| 100 | >146 | 72.5 |
| 120 | ([2]) | 88 |
| 160 | ([2]) | 120 |
| 180 | ([2]) | >146 |

[1] Melamine pyrophosphate.
[2] Not fluid.

The new crystalline form of melamine pyrophosphate can be used to advantage as a substitute for the old form thereof in any of the known flame retardant and intumescent compositions including, for example, those disclosed in U.S. Pats. 2,549,050; 2,755,260; 2,984,640 and 3,284,216 and the patents referred to therein but it is most advantageous in water based compositions such as latex paints. A sufficient amount of the new form may be incorporated into aqueous type intumescent compositions to produce a desirable effect without adversely affecting the working properties of the working composition. Intumescent compositions contain, in general, a volatile vehicle such as water which evaporates as the coating dries, a film former or binder such as a synthetic resin and spumific agents.

The intumescent coating compositions containing the novel form of melamine pyrophosphate may be applied by spraying, painting or dipping to various kinds of surfaces including wood, metal, glass, plastics or fabrics.

In the following examples, all parts are by weight unless otherwise specified.

EXAMPLE I

To about 910 parts of water are added about 57 parts of melamine with stirring and the slurry temperature is raised to about 80° C.

To the slurry are then added about 88.4 parts 37.2% aqueous hydrochloric acid with agitation. Solution of the melamine as melamine hydrochloride occurs almost immediately. The about 60 parts of powdered anhydrous tetrasodium pyrophosphate are added gradually with agitation while maintaining a temperature of about 80° C. Melamine pyrophosphate starts to precipitate almost immediately upon the initial addition of the sodium pyrophosphate. The temperature is held at about 80° C. while stirring an additional 15 minutes. Stirring is then discontinued and the thin white slurry is allowed to cool to about 67° C.; the solid is isolated by filtration, washed with water and dried at about 90° C. Dense, coarse, free-flowing white crystals of melamine pyrophosphate are obtained.

The following typical prior art process was followed to prepare a crystalline product for physical testing and comparison with the product of this invention:

To a slurry of 15.1 lbs. of melamine in 280 lbs. of water heated to 90° C. are added 12.5 lbs. of 22° Be' hydrochloric acid (4.4 lbs. HCl) and the slurry is stirred until a clear solution occurs. A solution of 17.6 lbs. of sodium pyrophosphate in 280 lbs. of water is then added to the melamine hydrochloride solution and the temperature is maintained at 90° C. An additional 13.9 lbs. (4.9 lbs. HCl) of 22° Be' hydrochloric acid is added. The reaction mixture is then cooled gradually to 25° C. and the solid is collected by filtration and dried. Each time the prior art product is used for comparison herein, it is the product prepared by this process.

X-ray analysis of the products of the foregoing prior art process and of Example I give the following results:

| Interplanar spacing or peak A. | Relative intensity, prior art product | Relative intensity, Example I |
| --- | --- | --- |
| 3.25 | 49 | 100 |
| 4.71 | 45 | 15 |
| 4.94 | 100 | 35 |
| 5.33 | 23 | 26 |
| 10.64 | | 12 |
| 10.77 | 67 | 16 |

Mixing equal parts by weight water and the prior art product produced a heavily bodied paste. About 6 parts by weight of this prior art product and about four parts water produced a damp crumbly paste.

In contrast thereto, equal parts by weight water and the product of Example I produced a substantially water-thin slurry as did also a mixture of about six parts by weight product of Example I and four parts water.

Similar results are obtained by replacing the tetrasodium pyrophosphate with an equivalent molar amount of tetrapotassium pyrophosphate either of which can be added as a powder or dissolved in water.

EXAMPLE II

To about 39.2 parts of melamine and about 65 parts of 70% nitric acid dissolved in about 1,500 parts of water at about 85° C. are added about 41.2 parts of tetrasodium pyrophosphate. Melamine pyrophosphate is precipitated, collected by filtration, washed with water and dried. X-ray analysis of the product shows it has the same crystalline structure as that of Example I.

EXAMPLE III

To about 800 parts water are added with stirring about 53.5 parts of 37% aqueous hydrochloric acid at about 80° C. About 50.4 parts of melamine, about 45.1 parts of 37.2% aqueous hydrochloric acid and about 50.8 parts of calcium pyrophosphate are added in that order while continuing to stir the slurry. After about 15 minutes at about 80° C., the slurry is cooled to about 70° C., filtered, washed with water and dried. The X-ray diffraction pattern of the resulting melamine pyrophosphate has a peak at 10.64 A. and has its maximum intensity at a peak of 3.25 A.

EXAMPLE IV

The process of Example III is repeated except about 55.4 parts magnesium pyrophosphate are substituted for the calcium pyrophosphate. The X-ray diffraction pattern of the resulting melamine pyrophosphate has a peak at 10.64 A. and has its maximum intensity at a peak of 3.25 A.

EXAMPLE V

To about 750 parts of water are added about 23.5 parts of 37.2% aqueous hydrochloric acid. After heating the resulting solution to about 80° C., about 68.2 parts of melamine, about 58 parts of 37.2% aqueous hydrochloric acid, and about 60 parts of disodium dihydrogen pyrophosphate dissolved in about 500 parts water are added sequentially with stirring. The resulting slurry is stirred briefly, cooled to about 70° C., filtered, washed with water and dried. The X-ray diffraction pattern of the resulting melamine pyrophosphate has a peak at 10.64 A. and has its maximum intensity at a peak of 3.25. A.

EXAMPLE VI

To a solution at about 80° C. of about 29.1 parts of 37.2% hydrochloric acid in about 420 parts of water are added with stirring about 25.2 parts of melamine. About 13.3 parts of tetrasodium pyrophosphate are added over a period of 10 minutes. About 19.2 parts of 37.2% hydrochloric acid are then added followed by about 13.3 parts of tetrasodium pyrophosphate. After stirring about 15 minutes at 80° C., the slurry is filtered, washed with water and dried. The product has an X-ray diffraction pattern with a peak at 10.64 A. and with its maximum intensity at a peak of 3.25 A.

EXAMPLE VII

About 50.4 parts melamine are dissolved in an aqueous solution at about 80° C. prepared from about 300 parts water and about 50 parts of 37.2% aqueous HCl. A solution of about 53.2 parts tetrasodium pyrophosphate in about 400 parts water at about 80° C. are added with stirring to the melamine solution. After about 15 minutes stirring, the slurry is filtered and the solid washed with water and dried. The X-ray diffraction pattern of the product has a peak at 10.64 A. and has its maximum intensity at a peak of 3.25 A.

EXAMPLE VIII

A mill base is prepared by mixing the following in a ball mill for about 20 hours:

|  | Parts |
|---|---|
| Water | 289.0 |
| Potassium tripolyphosphate | 1.5 |
| Ethoxylated castor oil | 4.0 |
| Melamine pyrophosphate (product of Example I) | 332.0 |
| Dipentaerythritol | 102.0 |
| Phenyl mercuric acetate | 0.5 |
| Defoamer (waxes-fatty esters) | 3.0 |
| Titanium dioxide (Unitane® OR-600) | 60.0 |
| Chlorinated paraffin | 40.0 |

The mill base is then reduced with:

| | |
|---|---|
| Hydroxyethyl cellulose (3% solution) | 45.0 |
| Vinyl acetate copolymer resin (55% solids in emulsion) | 220.0 |
| Defoamer (waxes-fatty esters) | 1.0 |

The resulting latex paint has a viscosity of 67 KU and possesses excellent scrub resistance, freeze-thaw and oven stability.

An attempt to repeat Example VIII using 332 parts of the product of the prior art process in place of that of Example I was unsuccessful because of the unworkable body of the mill base. About 200 parts of the prior art product is the maximum quantity that can be added to this formulation in order for the mill base to be dispersed. When the mill base is reduced in a similar manner as described in Example VIII, the viscosity of the paint is 67 KU.

The paint made from the old type crystals and the paint prepared in Example VIII can be evaluated for intumescent fire retardant properties as follows:

Douglas fir boards are coated at a total coverage of 125 sq. ft./gal. with two coats and air dried at room temperature for two days. A two-foot inclined test unit is used for determining the fire retardancy. A burner, using natural gas, is positioned so that the top of the burner is two inches from the test board. The flame is adjusted so that an uncoated red oak panel allows the flame front to reach in five minutes a rating of 100. A zero (0) rating is taken as the edge of the flame on an asbestos panel. The space between 0 and 100 is marked off into eight equal sections. The edge of the flame front is observed during burning and is recorded after five minutes. After the test, the maximum height of the char foam is measured.

| | Example VIII paint | Paint from old crystalline form |
|---|---|---|
| Flame spread | 0-2 | 18-20 |
| Char foam height (inches) | 0.95-1.0 | .25-.30 |

This data demonstrates that the maximum loading of the known form of melamine pyrophosphate which can be tolerated produces an emulsion type paint which is inferior to that provided by this invention.

EXAMPLE IX

The following are dispersed in a ball mill for about 16 hours:

|  | Parts |
|---|---|
| Water | 278.3 |
| Potassium tripolyphosphate | 3.0 |
| Ethoxylated castor oil | 4.0 |
| Defoamer (waxes-fatty esters) | 3.0 |
| Phenyl mercuric acetate | 0.5 |
| Melamine pyrophosphate (product of Example I) | 332.0 |
| Dipentaerythritol | 102.0 |
| Titanium dioxide | 60.0 |
| Chlorinated paraffin | 40.0 |
| Coalescent (ester-alcohol) | 8.5 |
| Hydroxyethyl cellulose (1.5% solution) | 45.0 |

The mill base is reduced with:

| | |
|---|---|
| Vinyl acrylic copolymer resin (55% solids in emulsion) | 220.0 |
| Defoamer (waxes-fatty esters) | 1.0 |

The resulting latex paint has a viscosity of 62 KU and exhibits excellent fire retardant intumescent properties when evaluated as described above with respect to Example VIII.

Using the test method as described in Example VIII involving application of the composition to Douglas fir boards, the following results are obtained:

Flame spread _____ 8
Char foam height (inches) _____ 0.6

EXAMPLE X

An oil-based paint useful as a fire retardant coating is prepared by dispersing the following ingredients in a pebble mill:

| | Parts |
|---|---|
| Vinyl toluene-butadiene resin | 51.1 |
| Chlorinated paraffin | 91.5 |
| Titanium dioxide | 67.0 |
| Melamine pyrophosphate (product of Example I) | 389.0 |
| Dipentaerythritol | 119.5 |
| Petroleum hydrocarbon fraction boiling range about 320° to 350° F. | 311.7 |

EXAMPLE XI

A mastic composition useful as a fire retardant coating for steel is prepared by mixing the following ingredients:

| | Parts |
|---|---|
| Water | 240 |
| Potassium tripolyphosphate | 2 |
| Ethoxylated castor oil | 5 |
| Melamine pyrophosphate (product of Example I) | 325 |
| Dipentaerythritol | 90 |
| Defoamer (waxes-fatty esters) | 3 |
| Titanium dioxide | 20 |
| Chlorinated paraffin | 45 |
| Hydroxyethyl cellulose (3% solution) | 45 |
| Vinyl acetate copolymer resin (55% solids emulsion) | 260 |
| Asbestos | 60 |

The defoamer used in the preceding examples is Colloid 677 sold by Colloid, Inc.

The description of the invention has to a large extent been with reference to intumescent coatings in which the melamine pyrophosphate along with a polyol or other material which burns with carbon charring cause foaming and the formation of a puffed up carbonaceous mass. However, the novel crystalline melamine pyrophosphate can be substituted for the old form of crystals in all fire retardant compositions for coating textiles or various other substrates. From about 25 to about 40 percent by weight of novel melamine pyrophosphate crystals give the best results in intumescent coating compositions.

Although the invention has been described in detail for the purpose of illustration, it is to be understood that variations can be made therein by those skilled in the art without departing from the spirit and scope of the invention.

We claim:

1. A readily water dispersible melamine pyrophosphate in a crystalline form which is dispersible in aqueous paint systems to form a fire retardant coating, which crystalline form is characterized by having the maximum intensity peak in its X-ray diffraction pattern at about 3.25 A, and other peaks at about 4.71, 4.94, 5.33, 10.64 and 10.77;

on heating loses weight substantially continuously with increasing temperature between 300° C. and 350° C.;

and which when pasted with water is stirrable and flowable in the proportions of between about 100 grams melamine pyrophosphate per 100 grams of water and about 180 grams of melamine pyrophosphate per 100 grams of water.

2. A process for the preparation of the crystalline form of melamine pyrophosphate of claim 1 which comprises mixing an ammonium, alkali metal or alkaline earth metal pyrophosphate salt including acid salts, with an aqueous medium which aqueous medium contains, at the time of said mixing, melamine and at least sufficient acid selected from the group consisting of hydrochloric acid, nitric acid and sulfuric acid to liberate substantially all of the pyrophosphoric acid from said pyrophosphate salt.

3. The process of claim 2 in which at the time of mixing said pyrophosphate salt, the aqueous medium is between about 50° C. and about 100° C. and contains sufficient of said acid to provide a total of at least four hydrogen ion equivalents per mole of pyrophosphate salt, including hydrogen ions contributed by the pyrophosphate salt.

4. The process of claim 3 which comprises mixing said pyrophosphate salt with a melamine acid salt in an aqueous medium having a molar ratio of at least about two moles of hydrochloric acid per mole of melamine.

5. The process of claim 2 wherein the acid is added sequentially but at least sufficient acid to liberate all of the pyrophosphoric acid from that portion of said pyrophosphate salt mixed in the aqueous medium is always present before such portion is mixed.

6. The process of claim 2 wherein the pyrophosphate salt is an alkali pyrophosphate.

7. The process of claim 2 which comprises mixing in water, melamine and hydrochloric acid in a ratio of at least four moles hydrochloric acid per two moles melamine, at a temperature of between about 75° C. and about 85° C., and mixing the resulting melamine hydrochloride in water mixture with about one mole tetrasodium pyrophosphate per two moles melamine.

References Cited

UNITED STATES PATENTS 2,984,640   5/1961   Kaplan _____ 260—249.6 X
3,284,216   11/1966  Kaplan _____ 260—249.6 X

OTHER REFERENCES

Vol'frovich et al., Akademiia Nauk SSSR. Izvestiia. Otdelenie khimichekikh nauk., vol. No. 6, (1946).

JOHN M. FORD, Primary Examiner

U.S. Cl. X.R.

260—45.8 N; 117—136; 106—15; 252—8.1; 260—17 A